(12) United States Patent
Petrak et al.

(10) Patent No.: US 11,780,289 B2
(45) Date of Patent: *Oct. 10, 2023

(54) SYSTEMS AND METHODS FOR BLOWER CONTROL

(71) Applicant: Transportation IP Holdings, LLC, Norwalk, CT (US)

(72) Inventors: Edward Thomas Petrak, Erie, PA (US); Nicole Lyann Himmelwright, Erie, PA (US); Jeffrey John Wolff, Erie, PA (US)

(73) Assignee: TRANSPORTATION IP HOLDINGS, LLC, Norwalk, CT (US)

(*) Notice: Subject to any disclaimer, the term of this patent is extended or adjusted under 35 U.S.C. 154(b) by 245 days.

This patent is subject to a terminal disclaimer.

(21) Appl. No.: 16/722,753

(22) Filed: Dec. 20, 2019

(65) Prior Publication Data

US 2020/0122550 A1 Apr. 23, 2020

Related U.S. Application Data

(63) Continuation of application No. 15/378,754, filed on Dec. 14, 2016, now Pat. No. 10,556,485.

(Continued)

(51) Int. Cl.
*G06F 17/00* (2019.01)
*B60H 1/00* (2006.01)
(Continued)

(52) U.S. Cl.
CPC ......... *B60H 1/00828* (2013.01); *B60H 1/008* (2013.01); *B60H 1/00978* (2013.01);
(Continued)

(58) Field of Classification Search
CPC ............... B60H 1/00828; B60H 1/008; B60H 1/00978; B60H 1/00807; F04D 25/06;
(Continued)

(56) References Cited

U.S. PATENT DOCUMENTS 4,466,230 A * 8/1984 Osselaere ............ A01D 75/282
209/318
4,858,676 A * 8/1989 Bolfik ................. G05D 23/1917
62/133

(Continued)

FOREIGN PATENT DOCUMENTS

EP 0363038 A2 * 4/1990
JP 2002067671 A * 3/2002
(Continued)

OTHER PUBLICATIONS

John Deere 9900 (Year: 2023).*
John Deere (Used Tractors) (Year: 2023).*

*Primary Examiner* — Ronnie M Mancho
(74) *Attorney, Agent, or Firm* — The Small Patent Law Group LLC; Christopher R. Carroll

(57) ABSTRACT

A system includes a blower, a blower sensor, and at least one processor. The blower sensor is operably coupled to the blower and configured to obtain blower operational information. The at least one processor is operably coupled to the blower and the blower sensor, and is configured to determine an operational-based power using the blower operational information; determine an operational-based density using the operational-based power; and control the blower using the operational-based density.

20 Claims, 4 Drawing Sheets

Related U.S. Application Data

(60) Provisional application No. 62/343,394, filed on May 31, 2016.

(51) Int. Cl.
    *G07C 5/08*       (2006.01)
    *F04D 25/08*     (2006.01)
    *F04D 25/06*     (2006.01)
    *F04D 27/00*     (2006.01)

(52) U.S. Cl.
    CPC .............. *F04D 25/06* (2013.01); *F04D 25/08* (2013.01); *F04D 27/001* (2013.01); *F04D 27/004* (2013.01); *G07C 5/0808* (2013.01); *B60H 1/00807* (2013.01); *F05D 2270/312* (2013.01); *F05D 2270/313* (2013.01); *F05D 2270/335* (2013.01)

(58) Field of Classification Search
    CPC ...... F04D 25/08; F04D 27/001; F04D 27/004; G07C 5/0808; F05D 2270/312; F05D 2270/313; F05D 2270/335; Y02B 30/70
    USPC .......................................................... 701/36
    See application file for complete search history.

(56) References Cited

U.S. PATENT DOCUMENTS

| | | | |
|---|---|---|---|
| 11,169,511 B2 * | 11/2021 | Cella | .................. G06Q 10/0639 |
| 11,175,653 B2 * | 11/2021 | Cella | .................. G05B 19/4184 |
| 2011/0067422 A1 * | 3/2011 | Ichishi | ................. B60H 3/0085 |
| | | | 62/176.1 |

FOREIGN PATENT DOCUMENTS

| | | | | |
|---|---|---|---|---|
| JP | 2003072363 A | * | 3/2003 | ......... B60H 1/00828 |
| JP | 2020106222 A | * | 7/2020 | |

\* cited by examiner

SYSTEMS AND METHODS FOR BLOWER CONTROL

RELATED APPLICATIONS

This application claims priority to U.S. patent application Ser. No. 15/378,754, entitled "SYSTEMS AND METHODS FOR BLOWER CONTROL," filed Dec. 14, 2016, which in turn claims priority to U.S. Patent Application 62/343,394, entitled "SYSTEMS AND METHODS FOR BLOWER CONTROL," filed May 31, 2016. The subject matter of the Ser. No. 15/378,754 application and the 62/343,394 application are incorporated by reference in their entirety.

BACKGROUND OF THE INVENTION

The subject matter disclosed herein relates generally to systems and methods for blower control, for example to systems and methods for the control of one or more blowers used to cool one or more portions or aspects of a vehicle.

Blowers are used to provide cooling in various applications. For example, a blower may be used to provide cooling air to one or more portions of a vehicle. To determine the amount of air to be provided, the air density may be calculated, for example based on information from one or more sensors configured to obtain ambient information. However, the sensors may become damaged or otherwise provide inaccurate information. Further, if one or more sensors become damaged or otherwise faulty, the vehicle may not be operated at full capacity until the damaged sensor or sensors are identified and repaired or replaced to avoid damage to the vehicle due to a risk of insufficient cooling.

BRIEF DESCRIPTION OF THE INVENTION

In one embodiment, a system is provided that includes a blower, a blower sensor, and at least one processor. The blower sensor is operably coupled to the blower and configured to obtain blower operational information. The at least one processor is operably coupled to the blower and the blower sensor, and is configured to determine an operational-based power using the blower operational information, determine an operational-based air density using the operational-based power, and control the blower using the operational-based air density.

In another embodiment, a method is provided that includes operating a blower to provide cooling air to at least one portion of a vehicle. The method also includes obtaining blower operational information with a blower sensor operably coupled to the blower. Further, the method includes determining an operational-based power using the blower operational information. The method includes determining an operational-based air density using the operational-based power. Also, the method includes controlling the blower using the operational-based air density.

In another embodiment, a method is provided that includes operating a blower and obtaining blower operational information with a blower sensor operably coupled to the blower. The method also includes measuring at least one ambient condition to obtain sensed ambient information. Also, the method includes determining an operational-based air density using the operational information, and determining a sensor-based air density using the sensed ambient information. Further, the method includes comparing the operational-based air density with the sensor-based air density. The method also includes determining that a fault exists when a difference between the operational-based air density and the sensor-based air density exceeds a threshold.

DETAILED DESCRIPTION OF THE INVENTION

Figure 1:
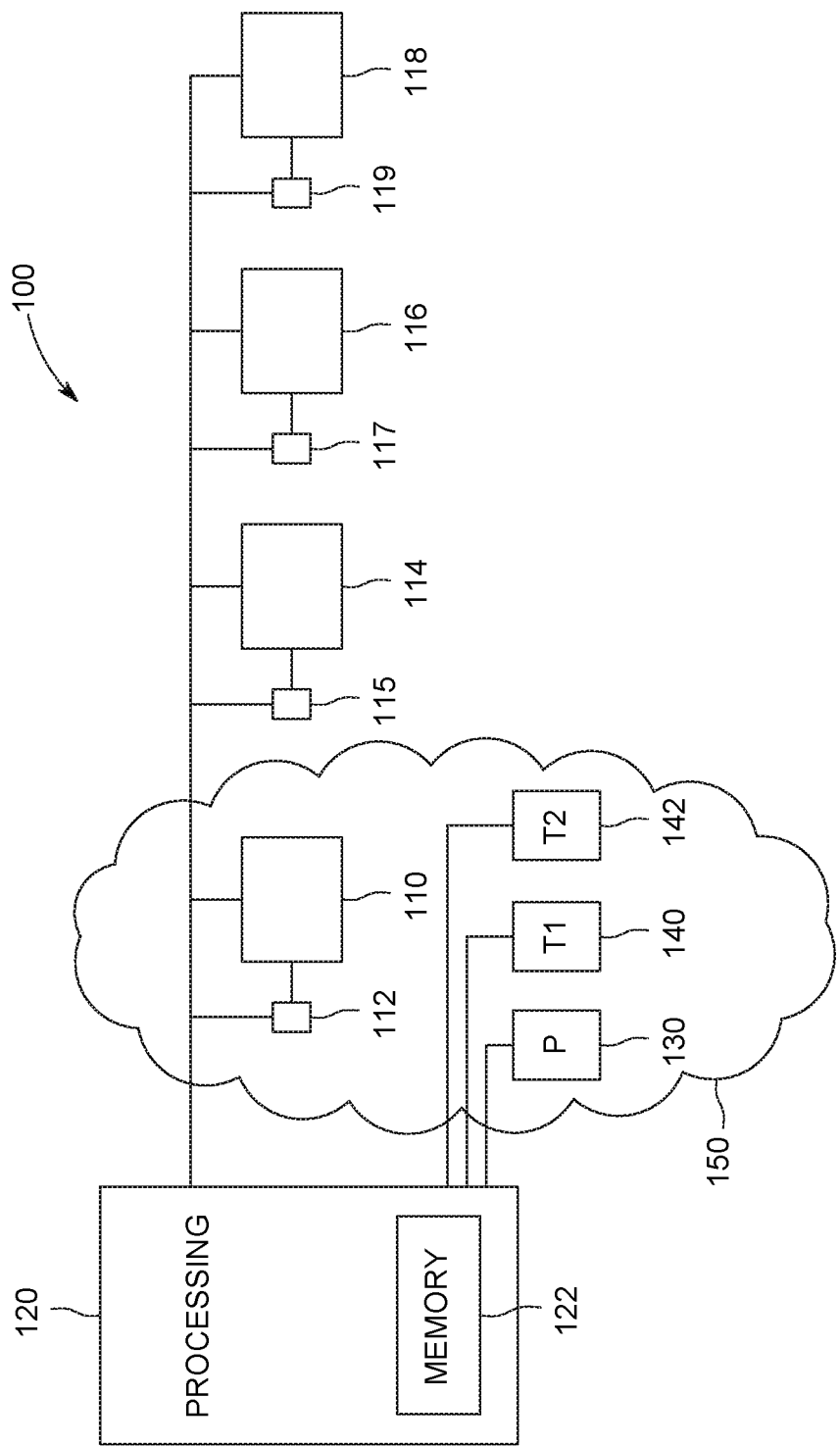
FIG. 1 is a schematic block diagram illustrating a blower system in accordance with various embodiments.

The following detailed description of certain embodiments will be better understood when read in conjunction with the appended drawings. To the extent that the figures illustrate diagrams of the functional blocks of various embodiments, the functional blocks are not necessarily indicative of the division between hardware circuitry. For example, one or more of the functional blocks (e.g., processors or memories) may be implemented in a single piece of hardware (e.g., a general purpose signal processor or a block of random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, the terms "system," "unit," or "module" may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. Various modules or units shown in the attached figures may represent the hardware that operates based on software or hardwired instructions, the software that directs hardware to perform the operations, or a combination thereof.

"Systems," "units," or "modules" may include or represent hardware and associated instructions (e.g., software stored on a tangible and non-transitory computer readable storage medium, such as a computer hard drive, ROM, RAM, or the like) that perform one or more operations described herein. The hardware may include electronic circuits that include and/or are connected to one or more logic-based devices, such as microprocessors, processors, controllers, or the like. These devices may be off-the-shelf devices that are appropriately programmed or instructed to perform operations described herein from the instructions described above. Additionally or alternatively, one or more of these devices may be hard-wired with logic circuits to perform these operations.

As used herein, an element or step recited in the singular and preceded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Various embodiments provide systems and methods for control of blowers. For example, in some embodiments, AC (alternating current) blowers may be controlled for cooling by controlling the speed of the blower to provide appropriate cooling at one or more system loading points. To determine the appropriate speed, a system demand for a given system operating state may be determined as a percentage of a full rated need in terms of mass flow rate. Then, an associated volumetric airflow may be determined to produce the mass flow system demand based on the current specific air density at the site of use. The determined volumetric airflow may then be scaled to a blower speed (e.g., in RPM) based upon a maximum volumetric airflow at full rated speed.

Accordingly, various embodiments provide for accurate determination of air density for determining the associated volumetric flow and blower control settings (e.g., control of blower speed). As temperature and pressure sensors are subject to failure and/or wear over time, various embodiments provide for not only detecting failed sensors but also providing an alternate or additional estimate of a sensed value and/or air density. Various embodiments utilize blower power feedback information for determination of blower health such as ducting defects, reverse rotation, or stuck impellers, among others.

Various embodiments leverage expected blower power calculated at various command speeds. Expected power is calculated in various embodiments using fan affinity laws and measured rated blower power at standard air conditions when running at rated speed. As such a calculation depends largely on the rated power for when the blower is operating correctly, if the blower is not running properly, the calculated power will not match precisely with an electrically calculated power. Such a power mismatch may be used to identify a faulty blower by comparison with healthy blowers. Similarly, a mismatch between a blower-based density and a sensor-based density may be used identify a fault. After a fault is determined, a blower system may be operated based on the determination of a fault. For example, a faulty blower may be turned off or operated at a lower capacity. Additionally or alternatively, one or more non-faulty blowers may be activated and/or operated at a higher capacity to compensate for the faulty blower. Further, if a fault is determined in a sensor, a value of the property sensed by the faulty sensor may be determined or estimated in an alternate fashion to provide an estimated replacement value, for example using blower power information, and the estimated replacement value used to determine or control blower operation (e.g., to determine blower speeds to be implemented).

In various embodiments, when an ambient sensor is faulty, the value of a property sensed by the ambient sensor is estimated using blower power information. Accordingly, the blower and system may use the estimated value to continue operation and schedule blower speeds with reasonable accuracy.

Various embodiments provide improved blower control. A technical effect of at least one embodiment includes increasing the likelihood of detecting a failed blower and/or ambient conditions sensor (e.g., barometric pressure sensor, temperature sensor). A technical effect of at least one embodiment includes providing a backup technique and estimation strategy to react to a failed barometric and/or ambient temperature sensor to provide appropriate cooling. A technical effect of at least one embodiment includes reduced possibility of inadequate system cooling.

FIG. 1 illustrates a system 100 that includes a blower 110, a blower sensor 112, and a processing unit 120, along with a pressure sensor 130, a first temperature sensor 140, and a second temperature sensor 142. It may be noted that various embodiments may include additional components, or may not include all of the components shown in FIG. 1 (for example, various embodiments may utilize some or all of the various sensors, or may utilize additional sensors alternatively or additionally). Further, it may be noted that certain aspects of the imaging system 100 shown as separate blocks in FIG. 1 may be incorporated into a single physical entity, and/or aspects shown as a single block in FIG. 1 may be shared or divided among two or more physical entities.

Generally, the blower 110 is configured to provide a cooling supply of air to a target location. The blower 110, in various embodiments, is an alternating current (AC) blower including fan blades attached to a shaft turned by an AC motor. The blower 110, for example, may include an electrical motor and impeller. The blower sensor 112 is operably coupled to the blower 110. In the illustrated embodiment, the blower sensor 112 obtains blower operational information. Blower operational information as used herein refers to information corresponding to or describing the functioning or use of the blower. For example, information relating to power consumed, shaft torque, shaft rotational speed, or the like during blower operation are examples of blower operational information. It may be noted that, while the blower sensor 112 is depicted as a separate block from the blower 110 in the example depicted in FIG. 1, in some embodiments the blower sensor 112 may alternatively or additionally be integral with or a part of the blower 110. Further, more than one sensor may be represented by the single block shown for the blower sensor 112. Examples of blower sensors include one or more devices to measure current and/or voltage of a blower motor, or, as another example, a dynometer or other device for measuring or determining torque and/or horsepower of a blower, or, as another example, a tachometer for measuring speed feedback.

The depicted processing unit 120 is operably coupled to the blower 110 and the blower sensor 112. For example, the processing unit 120 receives input information from the blower sensor 112 (e.g., blower operational information as discussed herein) and provides control signals to the blower 110 (e.g., signals controlling and/or adjusting a control signal to drive a blower shaft, such as one or more signals to control a voltage, current, and/or shaft rotational speed). The depicted processing unit 120 of the illustrated example determines an operational-based power using the blower operational information. For example, the processing unit 120 may determine a blower horsepower based on one or more readings of voltage, current, shaft torque, or shaft rotational speed obtained from the blower sensor 112.

The depicted processing unit 120 also determines an operational-based density using the operational-based power. The operational-based density represents or estimates the density of air used by the blower. As used herein, an "operational-based" property (e.g., density or power) may be understood as a property determined or estimated based on blower operational information (e.g., based directly on blower operational information, and/or based on a property previously determined based on blower operational information). Accordingly, for example, an operational-based power may be determined or estimated based on or using blower operation information, and an operational-based density may be determined or estimated based on or using an operational-based power. Further, for example, an operational-based power may be understood as an estimated power based on blower operational information, and an operational-based density may be understood as an estimated density based on an estimated power that is in turn based on blower operation information. In some embodiments, the standard fan affinity law may be used. The standard affinity law may be represented as follows:

$HP_{actual} = [HP_{rated}/(RPM_{rated}/RPM_{actual})^3]*[estDensity/0.075)]$, where $HP_{actual}$ is the actual horsepower of the blower in a current state of operation, $HP_{rated}$ is the horsepower of the blower at a known standard or reference rating condition (e.g., at standard temperature and pressure conditions, and being operated at a known RPM), $RPM_{rated}$ is the RPM of the blower at the known standard or reference rating condition, $RPM_{actual}$ is the actual RPM of the blower in the current state of operation, and estDensity is the estimated density of air proximate to the blower. Generally $HP_{rated}$ and $RPM_{rated}$ are known, for example by testing or calibration at the standard or reference rating condition. Then, if $HP_{actual}$ and $RPM_{actual}$ are known (e.g., by being determined using the blower operational information), the standard affinity law may be used to solve for the estimated density, which may be used to determine appropriate control settings or signals for the blower 110.

For example, using the estimated density, a desired operational setting such as speed (e.g., a rotational speed measured in RPM) of the blower 110 may be determined and implemented by the processing unit 120. The speed of the blower 110 may be controlled to provide appropriate cooling at one or more system load points. To determine the speed, in various embodiments, a system demand (referred to herein as SCFM) is calculated as a percent cooling of full rated need (e.g., in terms of mass flow) for a given system operating state. An associated volumetric airflow (referred to herein as ACFM) is then determined to produce the SCFM system demand based upon the air density proximate the blower 110. In some embodiments, the relationship between ACFM and SCFM may be stated as follows:

$ACFM = SCFM*(0.075/estDensity)$, where ACFM is the volumetric airflow, SCFM is the mass flow system demand for a given desired operational state or amount of cooling to be provided, and estDensity is estimated density of air proximate to the blower (e.g., ambient air at a site where a vehicle upon which the blower is disposed is being utilized).

The ACFM value may then be scaled to a blower RPM, for example using a known maximum ACFM measured at full rated speed. For example, in various embodiments, the following relationship may be employed:

$RPM_{actual} = (ACFM/ACFM_{rated})*RPM_{rated}$, where $RPM_{actual}$ is the speed to be used for the blower 110 at the desired operational state, ACFM is the volumetric airflow based on the system demand and air density at the site of use, $ACFM_{rated}$ is the volumetric airflow at a full rated speed, or maximum speed, $RPM_{rated}$ is the full rated or maximum speed.

In various embodiments, the processing unit 120 may also use other relationships among power, density, and/or ambient conditions (e.g., ambient temperature and/or pressure) to determine values of power, density, temperature, and/or pressure. For example, the following relationship may be used to calculate the estimated density:

$estDensity = (1.325*psia*2.036)/((degC+273.15)*(9/5))$, where estDensity is the estimated density of air proximate to the blower, psia is the ambient pressure in pounds per square inch, and degC is the ambient temperature in degrees Celsius. Accordingly, the estimated density may be determined using ambient pressure and temperature. Combining the above estimated density relationship with the fan affinity law, the following relationship is obtained:

$HP_{actual} = (HP_{rated}/(RPM_{rated}/RPM_{actual})^3)*((1.325*psia*2.036)/((degC+273.15)*(9/5))/0.075)$. This relationship may be re-arranged to solve for different properties as desired. Accordingly, with the rated power and blower shaft rotational speed known, if the measured power and speed are known, the density of the air may be determined. Further, if the measured power, speed and temperature are known, the relationship may be re-arranged to solve for pressure. Also, if the measured power, speed and density are known, the relationship may be re-arranged to solve for temperature. Accordingly, in various embodiments, density may be determined without a temperature or pressure sensor, pressure may be determined with a temperature sensor but not a pressure sensor, and temperature may be determined with a pressure sensor but not a temperature sensor.

Further, in the illustrated example, the processing unit 120 controls the blower using the operational-based density. As discussed above, once density is determined, for example, density may be used to determine an appropriate blower speed, which may be implemented under the control of the processing unit 120. Accordingly, in some embodiments, the operational-based density (e.g., the density determined using the measured power and the fan affinity law), may be directly used to determine an appropriate blower speed. As another example, the operational-based density may be used indirectly, for example to check a sensor-based density (e.g., a density determined using one or more sensors that sense ambient conditions such as pressure, temperature, and/or humidity).

As discussed-above, in addition to an operational-based density, in various embodiments, a sensor-based density may be determined. For instance, the example embodiment depicted in FIG. 1 includes a pressure sensor (e.g., barometer) 130 first temperature sensor (e.g., thermometer) 140, and a second temperature sensor (e.g., thermometer) 142. The pressure sensor 130, first temperature sensor 140, and second temperature sensor 142 provide examples of ambient condition sensors that detect one or more ambient conditions and provide information to the processing unit 120 relating to the one or more ambient conditions (e.g., a value of a condition such as temperature or pressure, or a signal from which the value may be determined).

For example, in the illustrated embodiment, the pressure sensor 130 obtains ambient pressure information of a volume 150 proximate the blower 110. It may be noted that the volume 150 may immediately surround the blower 110, or may be located in close physical proximity to the blower 110, such as located on a portion of vehicle on which the blower 110 is disposed. Also, the depicted first temperature sensor 140 obtains ambient temperature information of the volume 150. It may be noted that, in various embodiments, in which the first temperature sensor 140 is not located in the immediate vicinity of the blower 110, an adjustment to the temperature sensed by the first temperature sensor 140 may be made to determine a temperature of air provided to the blower 110. For example, if the temperature sensor 140 is located proximate ducting downstream of the blower 110, a correction or adjustment for blower rise may be made. The processing unit 120 is operably coupled to the pressure sensor 130 and the first temperature sensor 140 (e.g., the processing unit 120 receives information from the pressure sensor 130 and the first temperature sensor 140 regarding ambient conditions), and is configured (e.g., programmed) to determine a sensor-based density based on the ambient pressure information (obtained from the pressure sensor 130) and the ambient temperature information (obtained from the first temperature sensor 142). Also, the depicted processing unit 120 compares the sensor-based density with the operational-based density (e.g., the density determined using measured horsepower).

For example, in some embodiments, when the sensor-based density and the operational-based density are determined to differ by more than a threshold, the processing unit 120 determines a fault. As used herein, determining a fault may be understood as identifying that a fault exists somewhere in a system (e.g., at least one aspect of system 100 is not operating properly or is operating at an unsatisfactory level) and/or identifying a particular component or components that are not operating properly.

For example, one or more of the blower 110, blower sensor 112, pressure sensor 130, first temperature sensor 140, second temperature sensor 142 may be identified as having a fault. In some embodiments, expected information may be used to determine a component at fault. For example, if the pressure as determined using information from the pressure sensor 130 differs widely from an expected pressure (e.g., an expected pressure at a known elevation at which a vehicle on which the blower 110 is disposed is located), the pressure sensor 130 may be determined to be at fault. In some embodiments, redundant information may be used. For example, temperature information from the second temperature sensor 142 may be used to check temperature information from the first temperature sensor 140 (or vice versa). If the temperatures determined using information from the first temperature sensor 140 and the second temperature sensor 142 differs widely, one or both temperature sensors may be determined at fault. As another example, in some embodiments, multiple blowers may be employed, and an estimated density determined for each blower based on measured power of each blower. If a density determined using information from one of the blowers differs widely from the others, that particular blower (and/or associated sensor) may be determined to be at fault. Various remedial actions may be taken in response to determination of a fault. For example, information from a sensor determined to be at fault may be disregarded, with pertinent properties such as air density, pressure, and/or temperature determined using information from other sensors instead. As another example, a vehicle on which the blower 110 is disposed (or aspect thereof associated with the blower 110) may be operated at a reduced capacity until the fault can be addressed. As another example, one or more components identified as being at fault may be scheduled for inspection, repair, and/or replacement.

For example, if the pressure sensor 130 is determined to be at fault, the depicted processing unit 120 is configured to determine an estimated pressure using the ambient temperature information and the operational information. The estimated pressure may be used to control operation of the blower 110 and/or other aspect of a vehicle on which the blower 110 is disposed. For example, the estimated pressure may be used to determine a density which is then used to determine an appropriate blower speed for a given operational state.

As another example, if the first temperature sensor 140 is determined to be at fault, the depicted processing unit 120 is configured to determine an estimated temperature using the ambient pressure information and the operational information. The estimated temperature may be used to control operation of the blower 110 and/or other aspect of a vehicle on which the blower 110 is disposed. For example, the estimated temperature may be used to determine a density which is then used to determine an appropriate blower speed for a given operational state.

In some embodiments, when the sensor-based density and operational-based density are determined to not differ by more than a threshold (or are considered sufficiently close that no fault is determined), the processing unit 120 uses the sensor-based density to control the blower 110. However, if the sensor-based density differs from the operational-based density, and a sensor fault is determined, the processing unit 120 may use the operational-based density to control the blower 110. Thus, the operational-based density may be used to directly control the blower speed, and/or may be used indirectly to control the blower speed (by providing a density value for verifying the sensor-based value).

It may be noted that the particular numbers and types of sensors depicted in FIG. 1 are provided by way of example and not limitation, and that other arrangements of sensors may be used in alternate embodiments. For example, in some embodiments only one temperature sensor may be used. As another example, an additional pressure sensor may be provided for redundancy in other embodiments. As yet another example, in some embodiments, neither a temperature sensor nor a pressure sensor may be used to determined density, with only an operational-based density determined and used. As one more example, in some embodiments a pressure sensor may not be used, and the ambient pressure may instead be estimated based on elevation. As still another example, in some embodiments a humidity sensor may be employed and used to determine density and/or blower speed.

In the illustrated embodiment, the processing unit 120 is coupled to the blower 110 as well as the various sensors (e.g., blower sensor 112, pressure sensor 130, first temperature sensor 140, second temperature sensor 142). As discussed herein, the depicted processing unit 120 evaluates the information obtained via the sensors to determine a speed at which to operate the blower 110 to provide a desired amount of cooling to a target location based upon a determined density of air being used by the blower 110.

As seen in FIG. 1, the depicted processing unit 120 is operably coupled to the blower 110 and the various sensors. The processing unit 120, for example, may receive information from the blower sensor 112 regarding operation of the blower 110 (e.g., measured horsepower, measured speed (e.g., in RPM), measured voltage provided to the blower 110, measured electrical current provided to the blower 110, torque of shaft of the blower 110), ambient pressure information from the pressure sensor 130, ambient temperature information from the first temperature sensor 140, and/or ambient temperature information from the second temperature sensor 142. The processing unit 120 also provides control signals to the blower 110, for example to control the blower speed (e.g., by controlling a voltage and/or current provided to the blower 110). The processing unit 120 may include processing circuitry configured to perform one or more tasks, functions, or steps discussed herein. It may be noted that "processing unit" as used herein is not intended to necessarily be limited to a single processor or computer. For example, the processing unit 120 may include multiple processors and/or computers, which may be integrated in a common housing or unit, or which may distributed among various units or housings.

In the embodiment depicted in FIG. 1, the processing unit includes a memory 122. Generally, the various aspects of the processing unit 120 act individually or cooperatively with other aspects to perform one or more aspects of the methods, steps, or processes discussed herein (e.g., method 300 or aspects thereof, method 400 or aspects thereof). In the depicted embodiment, the memory 122 includes a tangible, non-transitory computer readable medium having stored thereon instructions for performing one or more aspects of the methods, steps, or processes discussed herein.

In various embodiments, the system 100 may include more than one blower. For example, the system 100 may be disposed on a vehicle with a number of different areas to be cooled, and having a number of blowers to provide cooling air to the different areas. The depicted system 100 includes several blowers in addition to blower 110, namely blower 114 (having associated blower sensor 115), blower 116 (having associated blower sensor 117), and blower 118 (having associated blower sensor 119). Blowers 114, 116, 118 may be generally similar in various respects to blower 110; however each blower may be configured to provide cooling air to a different location. Blower sensors 115, 117, 119 may be generally similar to blower sensor 112. Accordingly, using information from the corresponding sensor of each blower, the processing unit 120 may determine individual blower densities for two or more blowers (e.g., blowers 110, 114, 116, 118). The processing unit 120 may then compare determined individual blower densities, and identify at least one blower fault based on the comparison of the determined individual blower densities. For example, if an operational-based density determined using information regarding a given blower is widely different from those determined using other blowers, that particular blower may be determined to be at fault. Additionally or alternatively, densities computed using information from one or more blowers may be compared to sensor-based densities as part of identifying a blower fault. Further still, in some embodiments, a blower that otherwise would not be used for standard vehicle operation in a given state may nonetheless be operated to provide a check of one or more other blowers. For example, in a particular state of vehicle operation, a first blower may be used but a second blower not used. The second blower, however, may be operated for a period of time to obtain operational information of the second blower from which an operational-based density may be determined and compared with an operational-based density determined using information from the first blower. For instance, if the operational-based density determined using the first blower does not match a sensor-based density, the second blower may be operated to obtain a second operational-based density to help determine if the first blower is experiencing a fault. Further, if two or more blower operational-based density agree with each other but disagree with a sensor-based value, a sensor fault may be determined.

Figure 2:
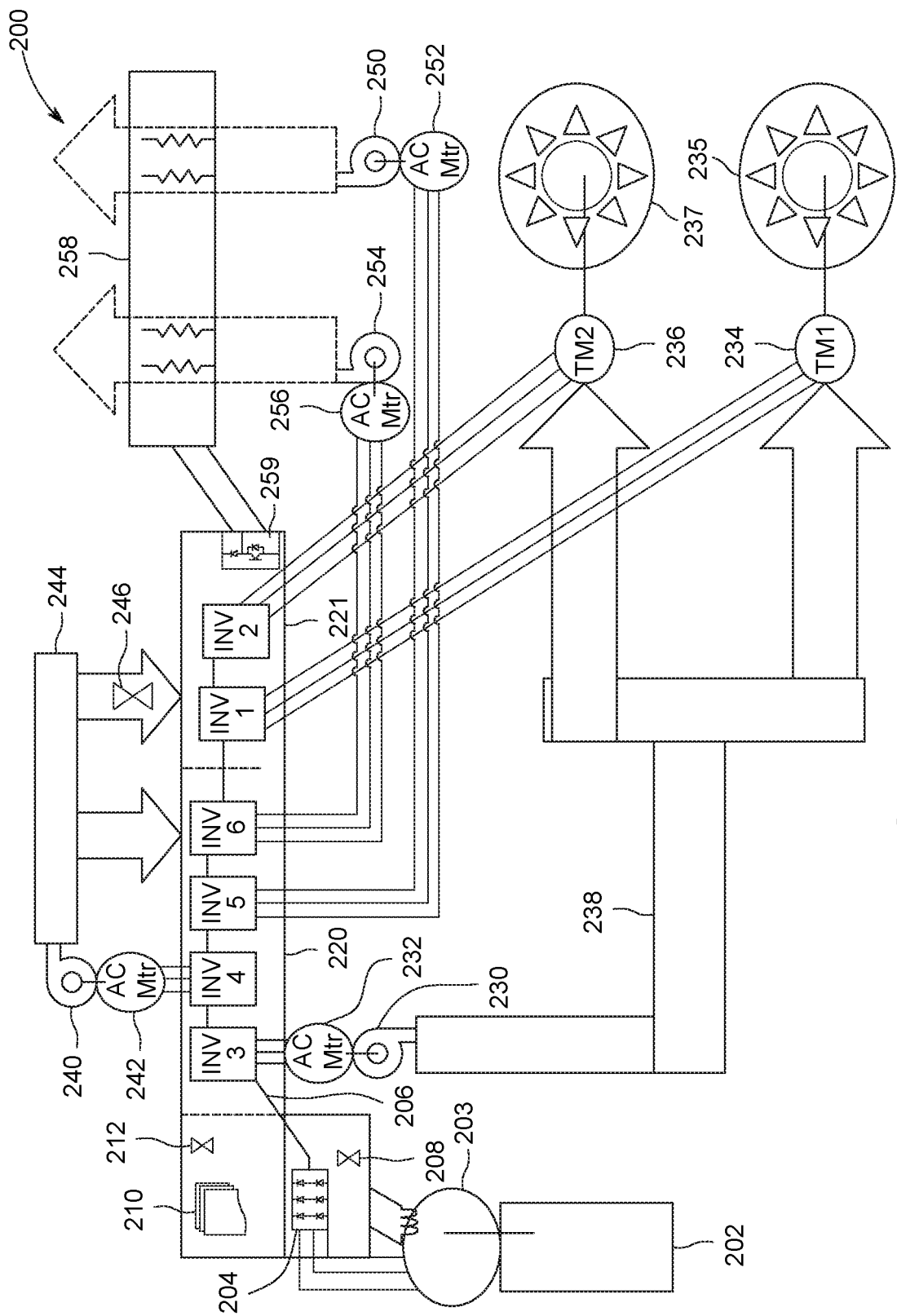
FIG. 2 is a schematic block diagram illustrating a vehicle system in accordance with various embodiments.

It may be noted that one or more aspects of the system 100 may be disposed on a vehicle such as a mining vehicle (e.g., a mining haul vehicle). FIG. 2 provides a schematic block diagram illustrating a vehicle system 200, which may be configured as a mining haul vehicle. As seen in FIG. 2, the system 200 includes a diesel engine 202 which is coupled to an Alternator Rectifier Static Exciter 204 via an alternator 203, which is in turn coupled, via a DC link 206, to a series of inverters, INV1, INV2, INV3, INV4, INV5, INV6. In the illustrated embodiment, the system 200 includes a static exciter heat sink thermistor 208. The static exciter heat sink thermistor 208 is an example of a temperature sensor. For example, in lower power cases, the heat sink may be considered as close to ambient temperature, and the static exciter heat sink thermistor 208 may be used in determining a relative estimate for redundant ambient temperature feedback (e.g., may be used to check a temperature determined using information from a different sensor).

The system 200 also includes a central processing unit (CPU) 210, which may include various low voltage electronics. The CPU 210 may incorporate one or more aspects of the processing unit 120 discussed herein. A pressure sensor 212 (e.g., a barometric pressure sensor) is disposed proximate the CPU 210 (e.g., in a common cabinet). The CPU 210 obtains information regarding ambient pressure from the pressure sensor 212.

In the illustrated embodiment, INV3, INV4, INV5, and INV6 are housed in an auxiliary invertor cabinet 220. INV3 is coupled to a wheel blower 230 via AC motor 232. Measurements and/or sensed/calculated feedback from INV3 and/or AC motor 232 (via voltage and/or current sensors and/or electrical frequency, etc.) provide operational information to the CPU 210 regarding power provided to the wheel blower 230. These voltage and current sensors may, for example, be within INV3 and/or between INV3 and AC motor 232. These voltage and current sensors may be representative of a blower sensor in FIG. 1 (e.g., 112, 115, 117, 119). Additionally or alternatively, a tachometer on the AC motor shaft coupling the blower impeller to the motor drive may be used to provide speed feedback of the blower. (It may be noted that in a tach-less mode of inverter/motor operation, synchronous AC fundamental electrical frequency and the number of motor poles may be used to instead compute blower RPM in place of a physical tach sensor). This sensed or calculated speed feedback may be representative of a blower sensor in FIG. 1 (e.g., 112, 115, 117, 119). Using the above defined power and speed measurements, in various embodiments, an operational-based density may then be determined. As seen in FIG. 2, the wheel blower 230 provides cooling air to a first traction motor 234 (associated with first wheel 235) and a second traction motor 236 (associated with second wheel 237) via ducting 238. The depicted CPU 210 determines the appropriate speed for the wheel blower 230 based, for example, on an air density determined using information from one or more of the ambient sensors 212, 208, 246, and the loading on the first traction motor 234 and the second traction motor 236, or the amount of cooling desired for the traction motors. As also seen in FIG. 2, INV1 and INV2 are coupled to, and provide power to, the first traction motor 234 and the second traction motor 236, respectively.

As also seen in FIG. 2, INV4 is coupled to a control blower 240 via AC motor 242. Measurements and/or sensed/calculated feedback from INV4 and/or AC motor 242 (via voltage and/or current sensors and/or electrical frequency, etc.) provide operational information to the CPU 210 regarding power provided to the control blower 240. These voltage and current sensors may be representative of a blower sensor in FIG. 1 (e.g., 112, 115, 117, 119). Additionally or alternatively, a tachometer on the AC motor shaft coupling the blower impeller to the motor drive may be utilized to provide speed feedback of the blower. (Again, it may be noted that in a tach-less mode of inverter/motor operation, synchronous AC fundamental electrical frequency and the number of motor poles may be used to instead compute blower RPM). This sensed or calculated speed feedback may be representative of a blower sensor in FIG. 1 (e.g., 112, 115, 117, 119). Using the above defined power and speed measurements, in various embodiments, an operational-based air density may then be determined. As seen in FIG. 2, the control blower 240 provides cooling air to the auxiliary inverter cabinet 220 as well as a traction cabinet 221 (traction cabinet 221 houses INV1 and INV2) via ducting 244. As also seen in FIG. 2, the system 200 includes an ambient temperature sensor 246 disposed in ducting 244 (e.g., downstream of control blower 240). The ambient temperature sensor 246 is coupled to the CPU 210 and provides ambient temperature information to the CPU 210. As the ambient temperature sensor 246 is located downstream of the control blower 240, information from the ambient temperature sensor 246 in the illustrated embodiment is corrected by the CPU 210 to account for blower rise, to provide an ambient temperature for air used by the control blower 240. The depicted CPU 210 determines the appropriate speed for the control blower 240 based, for example, on an air density determined using information from one or more of the ambient sensors 212, 208, and 246, and the amount of cooling desired for the inverters and/or other equipment housed in the cabinets coupled with the ducting 244.

As also seen in FIG. 2, INV5 is coupled to a first grid blower 250 via AC motor 252, and INV6 is coupled to a second grid blower 254 via AC motor 256. Measurements and/or sensed/calculated feedback from INV5/INV6 and/or AC motor 252/AC motor 256 (via voltage and/or current sensors and/or electrical frequency, etc.) provide operational information to the CPU 210 regarding power provided to the first grid blower 250 and the second grid blower 254. These voltage and current sensors may be representative of a blower sensor in FIG. 1 (e.g., 112, 115, 117, 119). Additionally, tachometers on the AC motor shafts coupling the grid blower impellers to the motor drives may be used to provide speed feedback of the blowers. (Again, in a tach-less mode of inverter/motor operation, synchronous AC fundamental electrical frequency and the number of motor poles may be used to instead compute blower RPM in place of a physical tach sensor). This sensed or calculated speed feedback may be representative of a blower sensor in FIG. 1 (e.g., 112, 115, 117, 119). Using the above defined power and speed measurements operational-based air densities may be determined. As seen in FIG. 2, the first grid blower 250 and the second grid blower 254 provide cooling air to dynamic braking retarding grids 258, which are also coupled to braking choppers 259. The depicted CPU 210 determines the appropriate speed for the first grid blower 250 and the second grid blower 254 based, for example, on an air density determined using one or more of ambient sensors 212, 208, 246, and the amount of cooling desired for the dynamic braking retarding grids 258.

Figure 3:
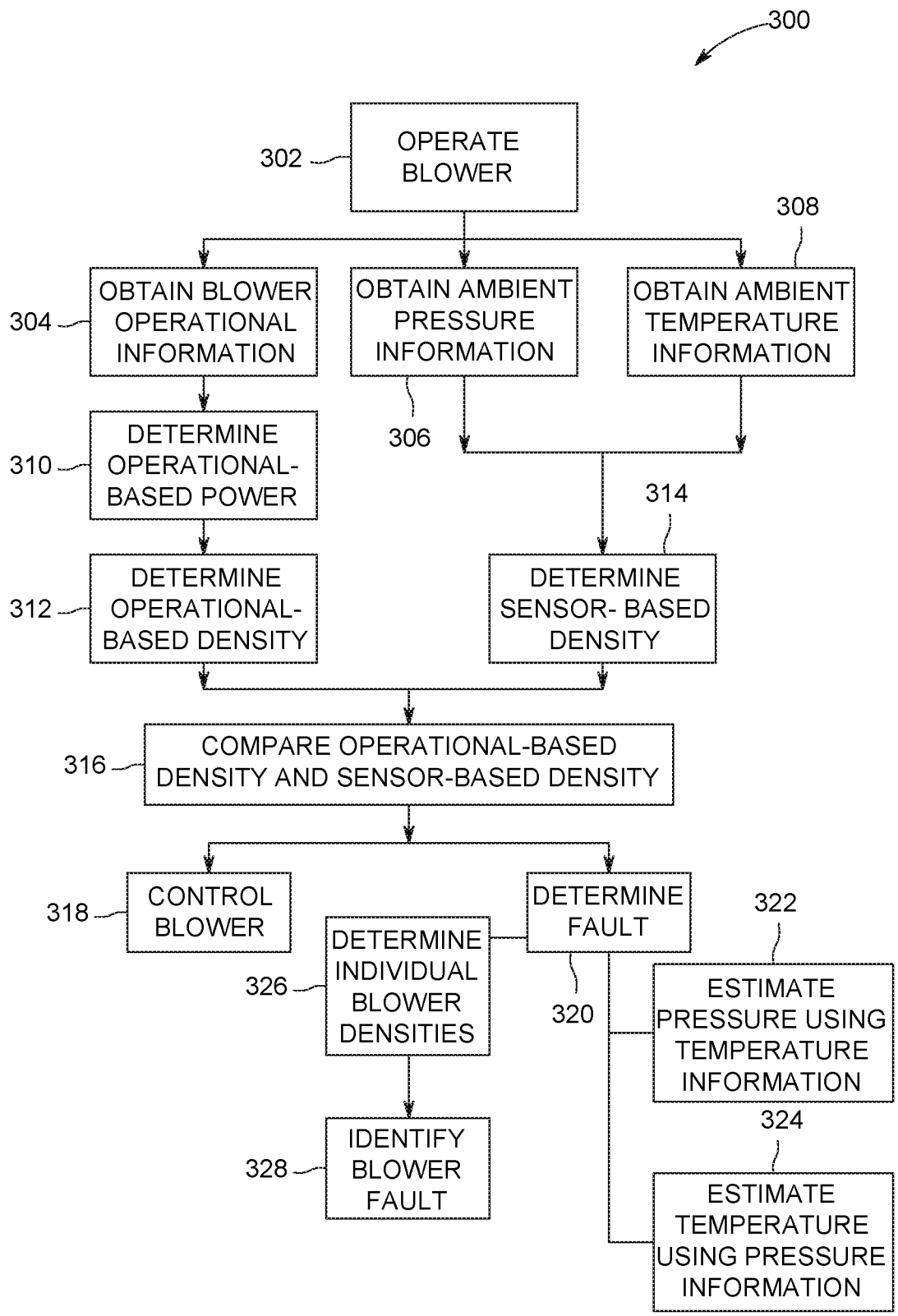
FIG. 3 is a flowchart of a method in accordance with various embodiments.

FIG. 3 provides a flowchart of a method 300 for operating one or more blowers (e.g., one or more blowers on a vehicle such as a mining haul vehicle). The method 300, for example, may employ or be performed by structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 300 may be able to be used as one or more algorithms to direct hardware (e.g., one or more aspects of the processing unit 120) to perform one or more operations described herein.

At 302, a blower (e.g., blower 110) is operated to provide cooling air to at least one portion of a vehicle (e.g., vehicle system 200). It may be noted that, as discussed herein, more than one blower may be operated and/or more than one portion of the vehicle may be cooled. Generally, the blower is operated at a speed to provide a desired amount of cooling. The speed is determined by one or more processors configured to determine an air density as discussed herein, and to provide appropriate control signals to the blower to implement the desired speed and amount of cooling.

At 304, blower operational information is obtained. The blower operational information in the depicted embodiment is obtained with a blower sensor (e.g., blower sensor 112) operably coupled to the blower. For example, the blower sensor may include one or more of a voltage sensor, a current sensor, or a speed tachometer coupled to a blower as discussed in connection with FIG. 2. Generally, the blower operational information corresponds to or describes one or more aspects of the operation of the blower, such as one or more of a current and/or voltage provided to the blower, an RPM of a shaft of a blower, a torque provided via a shaft of the blower, or the like.

At 306, ambient pressure information is obtained. The ambient pressure information may be obtained with a pressure sensor disposed in a volume proximate the blower, to help determine pressure of the air used by the blower (which may be used to determine a sensor-based density, for example). Also, at 308, ambient temperature information is obtained. The ambient temperature information may be obtained with a temperature sensor disposed in a volume proximate the blower, to help determine temperature of the air used by the blower (which may be used to determine a sensor-based density, for example). As discussed herein, the temperature information may be corrected to account for blower rise, for example if the temperature sensor is disposed downstream of a blower.

At 310, an operational-based power is determined using the blower operational information. At 312, an operational-based density is determined using the operational-based power determined at 308. The operational-based density is used to provide an estimate for the density of air used by the blower. For example, the fan affinity law may be used as discussed herein to determine an operational-based density.

At 314, a sensor-based density is determined. In the depicted embodiment, the sensor-based density is determined using the ambient pressure information obtained at 306 and the ambient temperature information obtained at 308. Alternatively, in some embodiments, an ambient condition may be estimated. For example, an estimated pressure based on elevation may be utilized to determine the sensor-based density and/or as a check on a value obtained via a pressure sensor.

At 316, the sensor-based density is compared with the operational-based density. Initially, on system startup/initialization both sensor and operational based densities may have been assumed valid until proven otherwise. As is such, at 318 the blower may be controlled using the sensor-based density and/or operational-based density initially. It may be noted that the operational-based density may be used directly, with the operational-based density used to calculate an appropriate blower speed. Alternatively, the operational-based density may be used indirectly, for example, to check or confirm a sensor-based density. For example, if the operational-based density and the sensor-based density are within a predetermined range, the sensor-based density may continue to be utilized and deemed valid. However, if the operational-based density and the sensor-based density are not within a predetermined range, a fault may be determined, and the density that is deemed more reliable based on the identified fault may be employed.

For example, at 320 of the illustrated embodiment, a fault is determined. For example, the fault may be determined when the sensor-based density and the operational-based density differ by more than a threshold (e.g., a predetermined threshold value). In some embodiments, if the pressure sensor is determined to be at fault, at 322, an estimated pressure is determined using the ambient temperature information and the operational information. Similarly, in some embodiments, if the temperature sensor is determined to be at fault, at 324, an estimated temperature is determined using the ambient pressure information and the operational information.

In some embodiments, a blower fault may be determined. For example, in the illustrated embodiment, at 326, individual blower densities for at least two blowers are determined, and, at 328, at least one blower fault is identified based on a comparison of the determined individual blowers. As one example, if three or more blower operational densities are determined, and only one of the determined operational densities is outside of a predetermined range of the others, than the corresponding blower (and/or blower sensor) may be identified as being at fault. As another example, if one blower operational-based density agrees with a sensor-based density, but a second blower operational-based density does not, the blower associated with the second blower operational-based density may be determined to be at fault.

Figure 4:
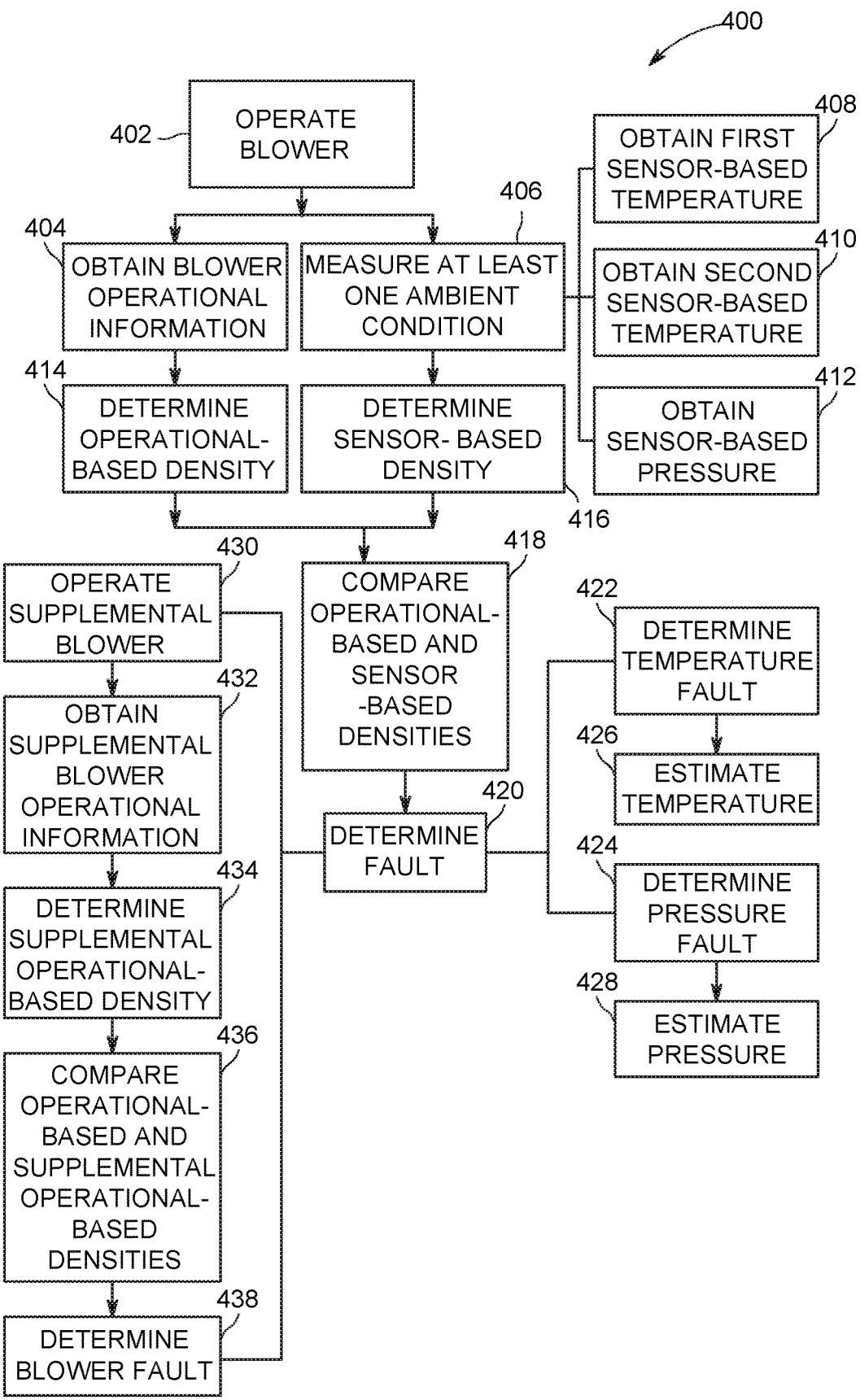
FIG. 4 is a flowchart of a method in accordance with various embodiments.

FIG. 4 provides a flowchart of a method 400 for operating one or more blowers (e.g., for identifying one or more faults of a system including one or more blowers). The method 400, for example, may employ or be performed by structures or aspects of various embodiments (e.g., systems and/or methods) discussed herein. It may be noted that one or more aspects of the method 400 may be used in conjunction with one or more aspects of the method 300. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 400 may be able to be used as one or more algorithms to direct hardware (e.g., one or more aspects of the processing unit 120) to perform one or more operations described herein.

At 402, a blower (e.g., blower 110) is operated to provide cooling air to at least one portion of a vehicle (e.g., vehicle system 200). It may be noted that, as discussed herein, more than one blower may be operated and/or more than one portion of the vehicle may be cooled. Generally, the blower is operated at a speed to provide a desired amount of cooling. The speed is determined by one or more processors configured to determine an air density as discussed herein, and to provide appropriate control signals to the blower to implement the desired speed and amount of cooling.

At 404, blower operational information is obtained. The blower operational information in the depicted embodiment is obtained with a blower sensor (e.g., blower sensor 112) operably coupled to the blower. For example, the blower sensor may include one or more of a voltage sensor, a current sensor, or a speed tachometer as discussed in connection with FIG. 2. Generally, the blower operational information corresponds to or describes one or more aspects of the operation of the blower, such as one or more of a current and/or voltage provided to the blower, an RPM of a shaft of a blower, a torque provided via a shaft of the blower, or the like.

At 406, at least one ambient condition is measured to obtain sensed ambient information. Generally, the sensed ambient information is utilized to provide a sensor-based density that may be compared to an operational-based density to either confirm the accuracy of a determined density or identify a fault. In the illustrated embodiment, at 408 a first sensor-based temperature is obtained with a first temperature sensor; at 410 a second sensor-based temperature is obtained with a second temperature sensor; and at 412, a sensor-based pressure is obtained with a pressure sensor.

At 414, an operational-based density is determined using the operational information (e.g., information obtained at 404). Also, at 416, a sensor-based density is determined using the sensed ambient information (e.g., information obtained at one or more of 406, 408, 410, 412). At 418, the operational-based density is compared to the sensor-based density.

At 420, a fault is determined when a difference between the operational-based density and the sensor-based density exceeds a threshold. The determination of the fault in some embodiments includes the identification that a fault exists somewhere within a system, whereas in other embodiments a particular component or components may be identified as having a fault.

For example, in the depicted embodiment, at 422, a temperature fault (e.g., a fault of one or more temperature sensors) is determined when a difference between the first sensor-based temperature obtained at 408 and the second sensor-based temperature obtained at 410 exceeds a threshold. As another example, at 424 of the depicted example, a pressure fault (e.g., a fault of a pressure sensor) is determined when a difference between the sensor-based pressure obtained at 412 and an expected pressure (e.g., an expected pressure at the altitude at which the blower is located) exceeds a threshold.

It may be noted that, in various embodiments, if a fault is determined with a first type of ambient condition sensor, information from another ambient condition sensor may be used to estimate the property sensed by the first type of ambient condition sensor. For example, at 426, an estimated temperature is determined using the blower operational information and a sensor-based pressure (e.g., if a fault is determined with sensing of temperature). As another example, at 428, an estimated pressure is determined using the blower operational information and a sensor-based temperature (e.g., if a fault is determined with sensing of pressure).

It may be noted that a fault with one or more blowers may be determined additionally or alternatively. For example, in the illustrated embodiment, at 430, a supplemental blower (e.g., a blower in addition to the blower operated at 402) is operated. It may be noted that the supplemental blower may be operated in conjunction with an operational state of a vehicle (e.g., to provide a desired amount of cooling to a portion of the vehicle in use that requires cooling), or may be operated strictly for the purpose of determining a blower fault. For example, the supplemental blower may be operated to provide cooling to a portion of a vehicle that currently does not have a cooling demand, with the supplemental blower operated to determine a supplemental air density for checking an air density determined using a different blower.

At 432, supplemental blower operation information is obtained, for example, via a supplemental blower sensor operably coupled to the supplemental blower. At 434, a supplemental operational-based air density is determined using the supplemental blower information obtained at 432. At 436, the supplemental operational-based air density obtained at 434 is compared to an operational-based air density determined at 414. At 438, a blower fault is determined to exist when a difference between the operational-based air density and the supplemental operational-based air density exceeds a threshold. In various embodiments, a particular blower may be identified as having a fault based on a comparison with a single additional blower-based air density and a sensor-based air density, or, as another example, based on a comparison with plural supplemental blower-based air densities.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid-state drive, optical disk drive, and the like. The storage device may also be other similar means for loading computer programs or other instructions into the computer or processor.

As used herein, the term "computer," "module," or "unit" may include any processor-based or microprocessor-based system including systems using microcontrollers, reduced instruction set computers (RISC), ASICs, logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, limitation, or element that is described as being "configured to" perform the task or operation. For example, a processing unit, processor, or computer that is "configured to" perform a task or operation may be understood as being particularly structured to perform the task or operation (e.g., having one or more programs or instructions stored thereon or used in conjunction therewith tailored or intended to perform the task or operation, and/or having an arrangement of processing circuitry tailored or intended to perform the task or operation). For the purposes of clarity and the avoidance of doubt, a general purpose computer (which may become "configured to" perform the task or operation if appropriately programmed) is not "configured to" perform a task or operation unless or until specifically programmed or structurally modified to perform the task or operation.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f) unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal language of the claims.

What is claimed is:

1. A system comprising: at least one processor configured to be operably coupled to at least a blower and at least a blower sensor, the at least one processor configured to:
   determine an operational-based power using blower operational information obtained by the blower sensor, the blower operational information representing functioning of the blower and including a power consumed by the blower and one or more of voltage, current, shaft torque, or shaft rotational speed;
   determine an operational-based air density using the operational-based power, wherein the operational-based air density is an estimate of density of air used by the blower and determined using the operational-based power; and
   control the blower using the operational-based air density.

2. The system of claim 1, wherein the at least one processor is operably coupled to a pressure sensor and a temperature sensor, the at least one processor configured to determine a sensor-based air density based on ambient pressure information obtained by the pressure sensor and ambient temperature information obtained by the temperature sensor, the at least one processor configured to compare the sensor-based air density with the operational-based air density.

3. The system of claim 2, wherein the at least one processor is configured to determine a fault responsive to the sensor-based air density and the operational-based air density differing by more than a threshold.

4. The system of claim 3, wherein the at least one processor is configured to determine an estimated air pressure using the ambient temperature information and the blower operational information responsive to the pressure sensor determined to be at fault.

5. The system of claim 3, wherein the at least one processor is configured to determine an estimated air temperature using the ambient pressure information and the blower operational information responsive to the temperature sensor determined to be at fault.

6. The system of claim 2, wherein the at least one processor is configured to use the sensor-based air density to control the at least a blower responsive to the sensor-based air density and the operational-based air density not differing by more than a threshold.

7. The system of claim 1, wherein the at least a blower is a first blower and a second blower, further wherein the at least a blower sensor is a first blower sensor and a second blower sensor.

8. A method comprising:
   obtaining blower operational information with a blower sensor operably coupled to a blower and configured to provide cooling air, the blower operational information representing functioning of the blower and including power consumed by the blower and one or more of voltage, current, shaft torque, or shaft rotational speed;
   determining an operational-based power using the blower operational information;
   determining an operational-based air density using the operational-based power, wherein the operational-based air density is an estimate of density of air used by the blower that is determined using the operational-based power; and
   controlling the blower using the operational-based air density.

9. The method of claim 8, further comprising:
   obtaining ambient pressure information of a volume of air proximate the blower with a pressure sensor;
   obtaining ambient temperature information of the volume of air with a temperature sensor;
   determining a sensor-based air density based on the ambient pressure information and the ambient temperature information; and
   comparing the sensor-based air density with the operational-based air density.

10. The method of claim 9 further comprising determining a fault when the sensor-based air density and the operational-based air density differ by more than a threshold.

11. The method of claim 10, further comprising determining an estimated air pressure using the ambient temperature information and operational information of the blower responsive to the pressure sensor being determined to be at fault.

12. The method of claim 11, further comprising determining an estimated air temperature using the ambient pressure information and the operational information when the temperature sensor is determined to be at fault.

13. The method of claim 9, comprising using the sensor-based air density to control the blower when the sensor-based air density and operational-based air density do not differ by more than a threshold.

14. A method comprising:
   obtaining blower operational information with a blower sensor operably coupled to a blower, the blower operational information representing functioning of the blower and including power consumed by the blower and one or more of voltage, current, shaft torque, or shaft rotational speed;
   measuring at least one ambient condition to obtain sensed ambient information;
   determining an operational-based air density using the blower operational information, wherein the operational-based air density is an estimate of density of air used by the blower determined using the blower operational information;
   determining a sensor-based air density using the sensed ambient information;
   comparing the operational-based air density with the sensor-based air density; and
   determining that a fault exists when a difference between the operational-based air density and the sensor-based air density exceeds a threshold.

15. The method of claim 14, further comprising:
   obtaining supplemental blower operational information with a supplemental blower sensor operably coupled to a supplemental blower;
   determining a supplemental operational-based air density using the supplemental blower operational information;
   comparing the supplemental operational-based air density to the operational-based air density; and
   determining a blower fault exists when a difference between the operational-based air density and the supplemental operational-based air density exceeds a threshold.

16. The method of claim 14, wherein measuring at least one ambient condition comprises obtaining a first sensor-based temperature with a first temperature sensor and a second sensor-based temperature with a second temperature sensor, the method further comprising determining a temperature fault when a difference between the first sensor-based temperature and the second sensor-based temperature exceeds a threshold.

17. The method of claim 14, wherein measuring at least one ambient condition comprises obtaining a sensor-based pressure with a pressure sensor, the method further comprising determining a pressure fault when a difference between the sensor-based pressure and an expected pressure exceeds a threshold.

18. The method of claim 14, wherein measuring at least one ambient condition comprises obtaining a sensor-based temperature with a temperature sensor and a sensor-based pressure with a pressure sensor, the method further comprising
    determining an estimated pressure using the blower operational information and the sensor-based temperature.

19. The method of claim 14, wherein measuring at least one ambient condition comprises obtaining a sensor-based temperature with a temperature sensor and a sensor-based pressure with a pressure sensor, the method further comprising determining an estimated temperature using the blower operational information and the sensor-based pressure.

20. The method of claim 14, further comprising operating the blower.

\* \* \* \* \*